April 7, 1942.  H. W. KOST  2,279,169

SHEET METAL FASTENER

Filed May 22, 1941

Inventor
HAROLD W. KOST
By Malcolm W. Fraser
Attorney

Patented Apr. 7, 1942

2,279,169

UNITED STATES PATENT OFFICE 2,279,169

SHEET METAL FASTENER

Harold W. Kost, Birmingham, Mich., assignor to Detroit Harvester Company, Detroit, Mich., a corporation of Michigan Application May 22, 1941, Serial No. 394,648

3 Claims. (Cl. 85—36)

This invention relates to fastening devices but more particularly to sheet metal fasteners designed to engage a threadless or threaded stud or shank for securing parts in assembled relation.

Heretofore fasteners of this type have been applied to studs of relatively softer material such as plastics which are affected by higher or lower than normal temperatures. These fasteners have not proved entirely satisfactory because when heated, the plastic stud becomes softer and when this occurs, fasteners of the type now in use by virtue of the fact that they all exert an outward pressure on the pin or stud to such an extent that the pressure referred to causes the stud to stretch and by so doing reduce in diameter. Clips of the type now used do not have sufficient adjusting qualities to compensate for such a shrinkage in stud diameters. Thereafter, the parts are not firmly held together and as a result, the looseness creates objectionable rattling or vibrational noises when in use, which is particularly annoying in connection with automobiles.

An object is to overcome the above difficulties and to produce a simple and efficient sheet metal fastener which is provided with stud-engaging arms or tongues that impart pressure against the stud axially to retain the parts securely in assembled relation but in such manner that the assembly of the nut to the stud remains tight at all times even at extreme temperatures.

Another object is to produce a sheet metal fastening device of the above character which is provided with oppositely arranged stud-engaging arms or tongues which when the fastener is in applied position, exerts its major force against the opposite sides of the stud and in a direction at substantially right angles to the longitudinal axis of the stud.

A further object is to produce a sheet metal fastener which is formed with opposed flexible tongues deformed to engage the threads of a threaded stud and which is adapted when in applied position, to bind upon the screw threads and impinge upon the root of the screw in an inclined direction toward the body of the fastener and toward the longitudinal axis of the screw.

Another object is to produce a one-piece sheet metal fastener having the new and improved features of construction, arrangement and operation hereinafter described, and, for purposes of illustration but not of limitation, embodiments of the invention are shown in the accompanying drawing in which Figure 1 is a top perspective view of the fastener;

Figure 1:
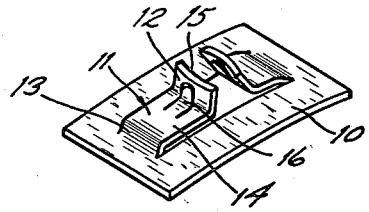
Figure 2:
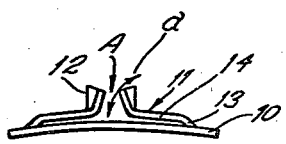
Figure 2 is a side elevation of the fastener.
Figure 3:
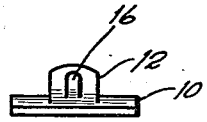
Figure 3 is an end elevation of the fastener.
Figure 4:
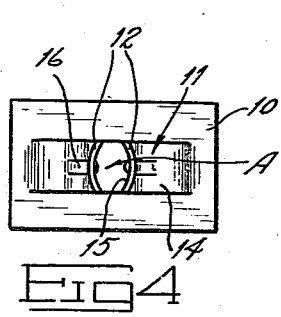
Figure 4 is a top plan view of the fastener.
Figure 5:
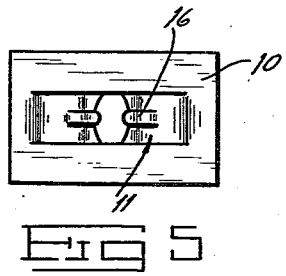
Figure 5 is a bottom plan view of the fastener.
Figure 6:
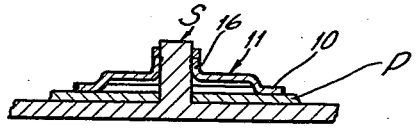
Figure 6 is a longitudinal sectional view of the fastener applied to a plastic stud.

The illustrated embodiment of the invention shown on Figures 1 to 6 comprises a substantially rectangular body portion 10 which is of spring sheet metal and in the normal position as indicated on Figure 1 it is cambered or arched upwardly in a longitudinal manner. Struck from the body portion 10 is a pair of arms or tongues 11 with the free end portions 12 thereof bent upwardly in a direction away from the body portion 10. It will be observed that each of the tongues 11 has a portion 13 which inclines outwardly away from the body portion and inwardly in a direction toward the opposite tongue. The tongue portion 13 merges into an elongate portion 14 which is substantially horizontally disposed although inclining slightly downwardly from its point of connection with the portion 13. The upwardly bent end portion 12 on each of the tongues 11 provides a curvilinear surface 15 for engagement with a plain shank stud. Struck from each tongue 11 in the region of the upturned portion 12 is a substantially L-shaped prong or barb 16, the free end portions of which are arranged to impinge against or bite into the surface of the stud as will hereinafter appear.

It will be apparent from the above description that the fastener provides a stud-receiving aperture A which is bounded by the curvilinear surfaces 15 of the upturned ends 12 of the tongues and the edges of the body portion adjacent the tongues. In use, the fastener is applied to a stud of somewhat greater diameter than the distance between the curvilinear surfaces 15 when the tongues 11 are in normal or unflexed condition, so that when the fastener is applied to a stud, such as S in Figure 6, the tongues 11 will be flexed outwardly. The fastener is forced down over the stud until it engages the surface of the panel P. Thereupon, pressure may be imparted to it to remove the camber of the body 10 so that the fastener lies flatly against the panel in applied position, although this operation is not necessary but such action increases the pressure of the tongues toward each other longitudinally on the stud S. Although the flexing movement of the tongues 11 in applied position is generally in a direction toward each other so that the curvilinear surfaces 16 will snugly embrace opposite sides of the stud S, nevertheless this movement is in a gentle arc toward the body portion 10 of the fastener, substantially as indicated by the arrow *a* on Figure 2.

It will be manifest that the spring action set-up is such as to impart pressure against the stud S toward the longitudinal axis thereof and then any force exerted to disturb this relationship would tend to further urge the opposing tongues inwardly and downwardly and prevent any tendency to pull outwardly on the stud from the base thereof, and due to the arrangement of barbs 16, any tendency of the stud to come loose is prevented.

In view of the construction and arrangement of the tongues 11 as above described, it will be manifest that the stud S is embraced in such manner that the formation of grooves due to softening of the plastic stud under heat is prevented. The stud is engaged over a substantial area and since the forces are exerted in directions toward the longitudinal axis of the stud and toward the body portion of the fastener, there will be no tendency to elongate or stretch the stud when the latter, under relatively high temperatures, becomes soft. This has been found to be quite troublesome because after the stud cools off, the elongation caused by the fastener results in looseness of the parts. Under some conditions grooves or notches would be formed in the soft stud which would afford a certain amount of play or looseness when the stud became hard again. All of these objections are overcome in the present fastener because of the manner in which forces are imparted to the stud S by the tongues 11.

Figure 7:
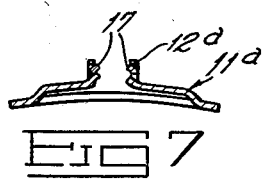
Figure 7 is a side elevation of an alternate form of fastener in which barbs or prongs are formed in the tongues in such manner as to engage the thread of a screw.
Figure 8:
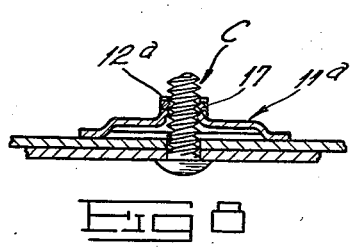
Figure 8 is a longitudinal sectional view of the fastener shown in Figure 7 applied to a screw for holding a pair of apertured panels in assembled relation.

In the form of the invention shown on Figures 7 and 8, the upstanding portion 12a of each tongue 11a is formed with a plurality of lips or prongs 17 which are struck from the portions 12a. The prongs 17 are arranged in such manner as to conform generally to the helix of the screw thread C to which the fastener is to be applied. The spacing of the prongs is greater than the pitch of the thread so that when pressure is exerted on the fastener to remove the camber from the body, it will be understood from the above description that the prongs 17 will not only bind on the thread of the screw but also impinge into the root diameter of the screw.

It is to be understood that numerous changes in details of construction, arrangement and operation may be effected without departing from the spirit of the invention especially as defined in the appended claims.

What I claim is:

1. A fastener comprising a longitudinally cambered spring metal body, a pair of cooperating tongues struck from the body with the free end portions adjacent each other, upturned end portions on said tongues providing a stud-receiving opening therebetween of a diameter less than the diameter of the stud for which the fastener is intended, said upturned end portions being shaped snugly to embrace the stud for which the fastener is intended and of such dimension as to engage same over a substantial area thereof, each tongue adjacent the body inclining abruptly away from the body and then merging into an elongate portion disposed substantially parallel to said body and terminating in said upturned end portion whereby the tongues are urged in an arcuate path toward the stud and inwardly toward said body.

2. A fastener comprising a longitudinally cambered spring metal body, a pair of cooperating tongues struck from the body with the free end portions adjacent each other, upturned curvilinear end portions on said tongues providing a stud-receiving opening therebetween of a diameter less than the diameter of the stud for which the fastener is intended, prongs struck from said tongues arranged to impinge against the stud in applied position, the tongues being so constructed and arranged that upon removing the camber from the body, the tongues impart the major portion of their force toward the stud in a direction at substantially right angles to the longitudinal axis thereof.

3. A fastener comprising a longitudinally cambered spring metal body, a pair of cooperating tongues struck from the body with the free end portions adjacent each other, upturned curvilinear end portions on said tongues providing a stud-receiving opening therebetween of a diameter less than the diameter of the stud for which the fastener is intended, prongs struck from said tongues and arranged to conform generally to the screw thread on the stud but spaced a distance greater than the pitch thereof, the tongues being so constructed and arranged that upon removing the camber from the body, the tongues impart the major portion of their force toward the stud in a direction at substantially right angles to the longitudinal axis thereof.

HAROLD W. KOST.